(12) United States Patent
Faruque et al.

(10) Patent No.: US 11,110,879 B2
(45) Date of Patent: Sep. 7, 2021

(54) AIRBAG INFLATABLE ALONG A SEATBELT WEBBING

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 16/679,935

(22) Filed: Nov. 11, 2019

(65) Prior Publication Data

US 2021/0138990 A1    May 13, 2021

(51) Int. Cl.
| | |
|---|---|
| *B60R 21/18* | (2006.01) |
| *B60R 21/235* | (2006.01) |
| *B60R 21/201* | (2011.01) |
| *B60R 22/18* | (2006.01) |
| *B60R 21/231* | (2011.01) |
| *B60R 21/215* | (2011.01) |
| *B60R 21/00* | (2006.01) |
| *B60R 21/0136* | (2006.01) |

(52) U.S. Cl.
CPC ............ *B60R 21/18* (2013.01); *B60R 21/201* (2013.01); *B60R 21/215* (2013.01); *B60R 21/231* (2013.01); *B60R 21/235* (2013.01); *B60R 22/18* (2013.01); *B60R 21/0136* (2013.01); *B60R 2021/0023* (2013.01); *B60R 2021/23509* (2013.01); *B60R 2022/1806* (2013.01)

(58) Field of Classification Search
CPC ...................................................... B60R 21/18
USPC ......................................................... 280/733
See application file for complete search history.

(56) References Cited

U.S. PATENT DOCUMENTS

| | | | |
|---|---|---|---|
| 5,333,902 A | 8/1994 | Hatfield | |
| 6,382,666 B1 * | 5/2002 | Devonport | .............. B60R 21/18 280/730.1 |
| 6,442,807 B1 | 9/2002 | Adkisson | |
| 7,322,603 B2 | 1/2008 | Gray et al. | |
| 8,308,190 B2 | 11/2012 | Smith et al. | |
| 2004/0164532 A1 * | 8/2004 | Heidorn | ................ B60R 21/201 280/733 |
| 2012/0306185 A1 | 12/2012 | Kim et al. | |
| 2015/0069741 A1 * | 3/2015 | Shimazu | ................. B60R 21/18 280/728.3 |

FOREIGN PATENT DOCUMENTS

JP          2009202861 A  *  9/2009

\* cited by examiner

*Primary Examiner* — Keith J Frisby
(74) *Attorney, Agent, or Firm* — Frank A. MacKenzie; Bejin Bieneman PLC

(57) ABSTRACT

An assembly includes a seatbelt latch having a first slot and a seatbelt webbing extending through the first slot. The assembly includes an airbag mounted to the latch. The airbag extends in a continuous loop defining a second slot, the seatbelt webbing extending through the second slot.

20 Claims, 7 Drawing Sheets

AIRBAG INFLATABLE ALONG A SEATBELT WEBBING

BACKGROUND

Vehicles are subject to impact testing for different types of collisions. Angular vehicle impacts may urge the occupant forward and may urge the shoulders of the occupant to twist. In one example, a test procedure simulates an impact of a test vehicle from another vehicle at an oblique angle. The test procedure provides that a moving deformable barrier impacts the test vehicle with a speed of 56 miles per hour (mph) with a 35% overlap from a center of a front of the test vehicle and at an angle of 15° from a vehicle-forward direction. This test has been proposed by the National Highway Traffic Safety Administration (NHTSA) for inclusion in the United States New Car Assessment Program (US-NCAP). Other examples of angular impact include small offset rigid barrier (SORB).

DETAILED DESCRIPTION

Figure 1:
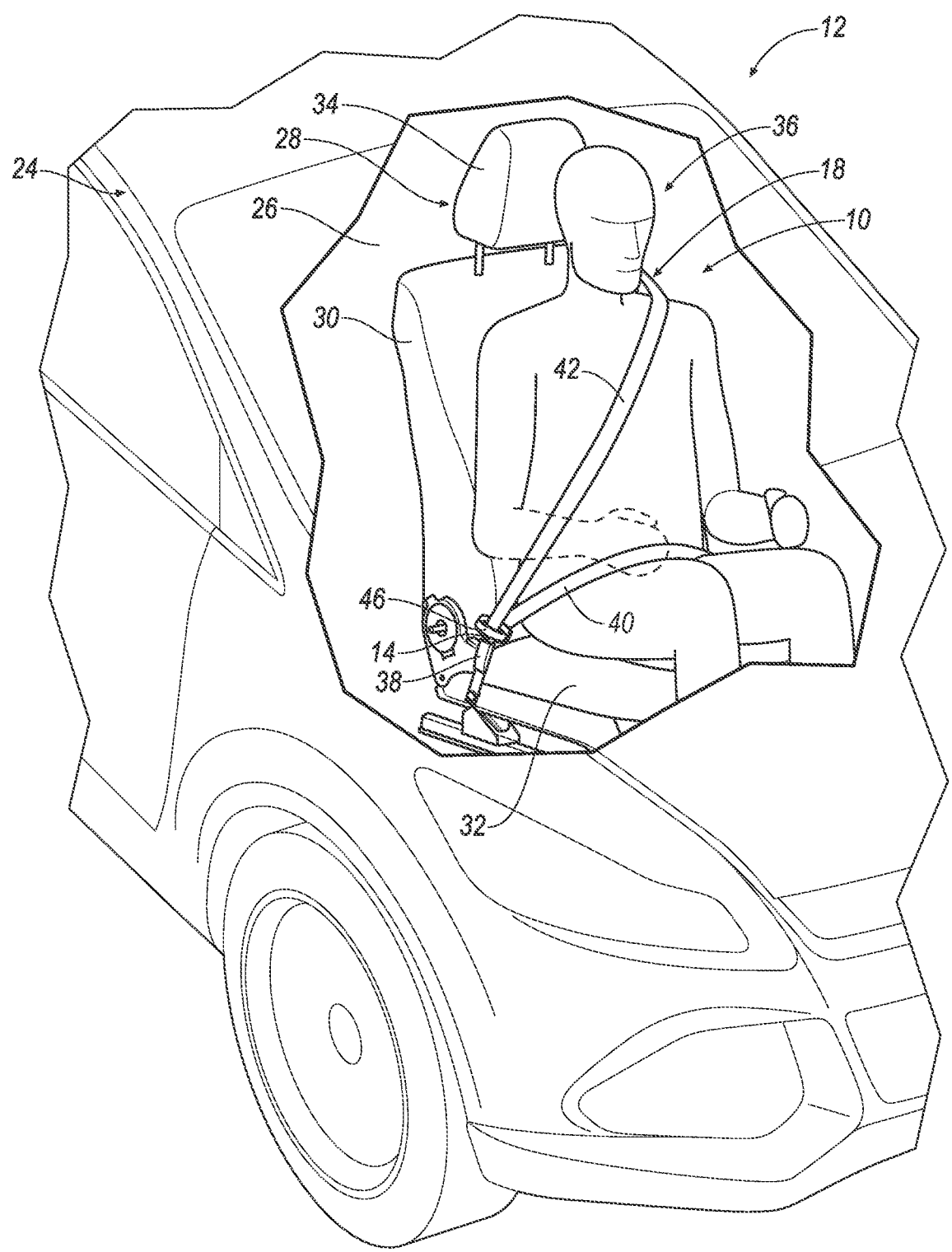
FIG. 1 is a cut-away view of a vehicle with an occupant sitting in a seat with a seatbelt latch slidable along a seatbelt webbing engaged with a seatbelt buckle.

An assembly includes a seatbelt latch having a first slot, a seatbelt webbing extending through the first slot, an airbag mounted to the latch with the airbag extending in a continuous loop defining a second slot and the seatbelt webbing extending through the second slot.

The airbag may be inflatable away from the latch along the webbing to an inflated position.

The airbag may have a fixed end mounted to the latch and a distal end movable away from the latch along the webbing toward the inflated position with the second slot extending through the fixed end and the distal end.

The airbag may be elongated from the fixed end to the distal end in the inflated position.

The seatbelt webbing may extend across a pressure sensor in a chest of a THOR crash test dummy when the airbag is in the inflated position with the distal end biasing the seatbelt webbing away from the pressure sensor.

The airbag may have a fixed end mounted to the latch and a distal end spaced from the fixed end in the inflated position with the second slot extending through the fixed end and the distal end.

The airbag may be tubular about the seatbelt webbing in the inflated position.

The airbag may be inflatable radially relative to the seatbelt webbing.

The airbag may include an inner surface extending around the second slot, an exterior surface, and an inflation chamber between the exterior surface and the inner surface.

The airbag may have a fixed end mounted to the latch and a distal end movable away from the latch along the webbing toward the inflated position with the inner surface and the exterior surface extending from the fixed end to the distal end.

The airbag may include a sleeve having the inner surface, the sleeve being tear resistant relative to the exterior surface.

The sleeve may be of a different material type than the exterior surface.

The seatbelt latch may be supported by and slidable along the seatbelt webbing.

The assembly may include an inflator in communication with the airbag.

The assembly may include a seatbelt buckle engageable with the latch, the seatbelt buckle including a connector in fluid communication with the inflator and in fluid communication with the airbag when the seatbelt latch is engaged with the seatbelt buckle.

The seatbelt latch may include a connector in fluid communication with the airbag and in fluid communication with the connector of the seatbelt buckle when the seatbelt latch is engaged with the seatbelt buckle.

The assembly may include a cover connected to the latch, the cover encasing the airbag in an uninflated position.

The airbag may be fabric and the seatbelt latch is plastic and/or metal.

The assembly may include a computer programmed to inflate the airbag to the inflated position in response to an offset impact.

With reference to the Figures, wherein like numerals indicate like parts throughout the several views, an assembly 10 for a vehicle 12 includes a seatbelt latch 14 that has a first slot 16. A seatbelt webbing 18 extends through the first slot 16. An airbag 20 is mounted to the seatbelt latch 14 and the airbag 20 extends in a continuous loop defining a second slot 22. The seatbelt webbing 18 extends through the second slot 22.

The airbag 20 extending in a continuous loop with the seatbelt webbing 18 extending through the first and second slots 16, 22 allows the airbag 20 to inflate from an uninflated position to an inflated position such that the airbag 20 in the inflated position encircles the seatbelt along a length of the seatbelt. The airbag 20 biases the seatbelt away from an occupant, which may lower load on the occupant applied by the seatbelt webbing 18 in the event of an impact, e.g., an offset impact, to the vehicle 12. The airbag 20 remains mounted to the seatbelt latch 14 after the airbag 20 inflates to the inflated position with the airbag 20 inflating along the seatbelt webbing 18 to the inflated position.

Figure 2:
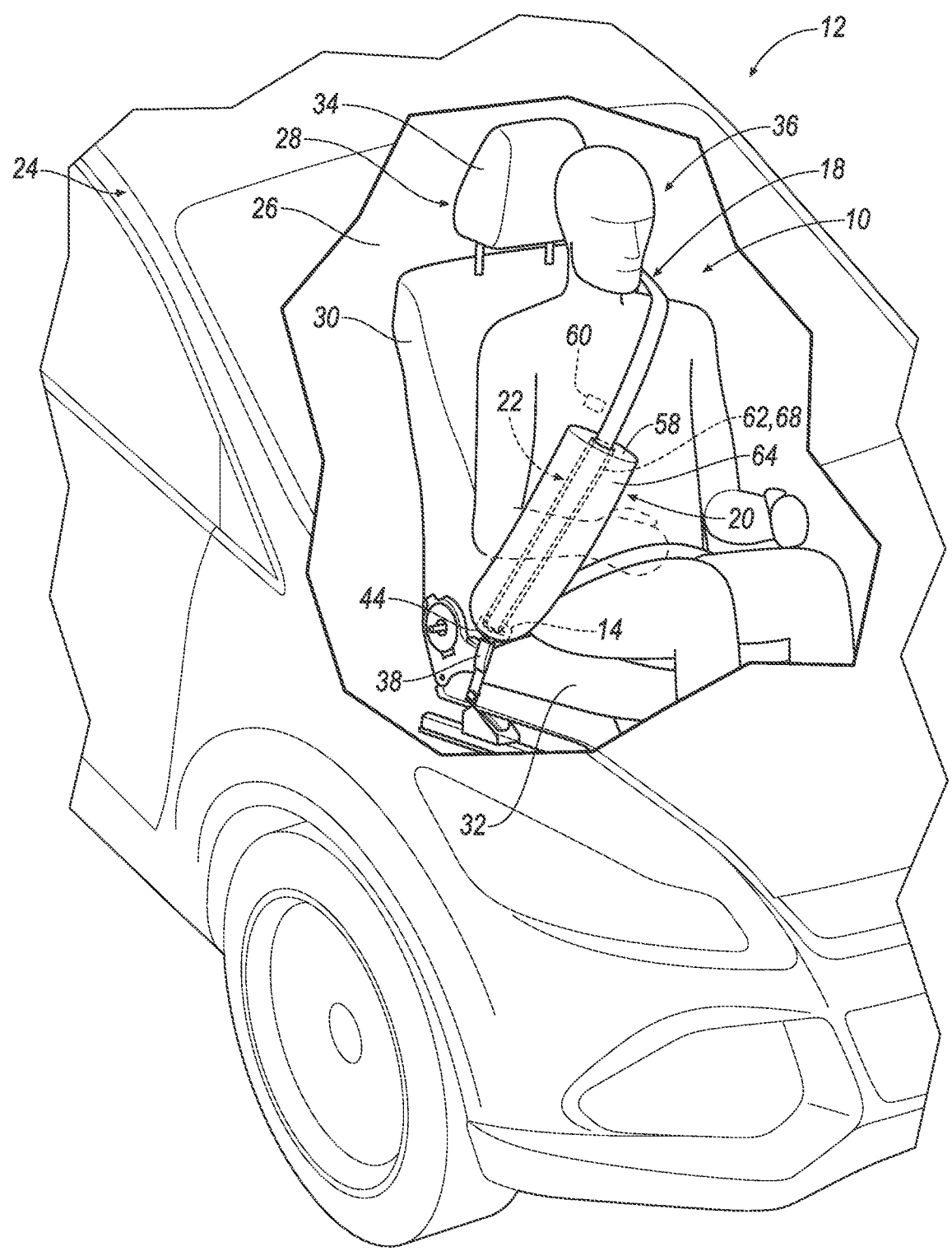
FIG. 2 is a cut-away view of the vehicle of FIG. 1 with an airbag in an inflated position along the seatbelt webbing.

As shown in FIGS. 1 and 2, the vehicle 12 may be any type of passenger or commercial automobile, such as a car, a truck, a sport utility vehicle, a crossover vehicle, a van, a minivan, a taxi, a bus, etc. The front, rear, left side, and right side are from the perspective of the vehicle 12 by an occupant in a forward-facing seat.

The vehicle 12 includes a body 24 defining a passenger cabin 26 to house occupants, if any, of the vehicle 12. The passenger cabin 26 may include one or more seats 28. One or more of the seats 28 may be disposed at a front of the passenger cabin 26 and one or more of the seats 28 may be disposed behind the front seats. The passenger cabin 26 may include third-row seats (not shown) at a rear of the passenger cabin 26. In FIG. 1, the seat 28 is shown as a front seat. As other examples, the seat 28 may be a rear seat, third-row seat, etc. The position and orientation of the seats 28 and components thereof may be adjustable by the occupant. In examples including multiple seats 28, some or all of the seats 28 may each include the airbag 20 on the seatbelt latch 14 as described herein.

The seat 28 may include a seat back, a seat bottom 32, and a head restraint 34. The head restraint 34 may be supported by the seat back 30 and may be stationary or movable relative to the seat back. The seat back 30 may be supported by the seat bottom 32 and may be stationary or movable relative to the seat bottom 32. The seat back, the seat bottom 32, and/or the head restraint 34 may be adjustable in multiple degrees of freedom. Specifically, the seat back, the seat bottom 32, and/or the head restraint 34 may themselves be adjustable, in other words, adjustable components within the seat back, the seat bottom 32, and/or the head restraint 34, and/or may be adjustable relative to each other.

The seat bottom 32 and/or seat back 30 may include a frame (not shown). The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel aluminum, etc.

The vehicle 12 includes a seatbelt assembly 36 including the seatbelt webbing 18, a retractor (not shown), the seatbelt latch 14, and a seatbelt buckle 38. The seatbelt assembly 36 may be, as shown in the example shown in the figures, a three-point harness, meaning the seatbelt webbing 18 is attached at three points around the occupant when fastened, e.g., a lap belt mounting, the retractor, and the buckle. The seatbelt assembly 36 may, alternatively, include another arrangement of attachment points. The seatbelt webbing 18 may include a lap band 40 and a shoulder band 42. As a three-point harness, the lap band 40 mounting attaches one end of the webbing 18 to the frame of the seat bottom 32 or the body 24 of the vehicle 12. The other end of the webbing 18 feeds into the retractor, which may include a spool that extends and retracts the webbing 18. The retractor may be mounted to the frame of the seat back 30 or the body 24 of the vehicle 12. In the example shown in the Figures, the retractor is mounted to an upper end of a pillar of the body 24 and the lap band 40 mounting is at a lower end of the pillar.

As shown in FIGS. 1, 2, 3, and 5, the seatbelt buckle 38 is engageable with the seatbelt latch 14. Specifically, the seatbelt buckle 38 is releasably engageable with the seatbelt latch 14, as is known. The seatbelt latch 14 may be engaged with the seatbelt buckle 38 when an occupant is in the seat. The seatbelt latch 14 is supported by and slidable along the seatbelt webbing 18. Specifically, the webbing 18 slidably extends through the first slot 16 and the seatbelt latch 14 is retained to the seatbelt webbing 18 through the first slot 16. When engaged with the seatbelt buckle 38, the seatbelt latch 14 divides the seatbelt webbing 18 into the lap band 40 and the shoulder band 42.

The seatbelt latch 14 may be plastic and/or metal. The seatbelt latch 14 may be any suitable material to engage with the seatbelt buckle 38.

Figure 3:
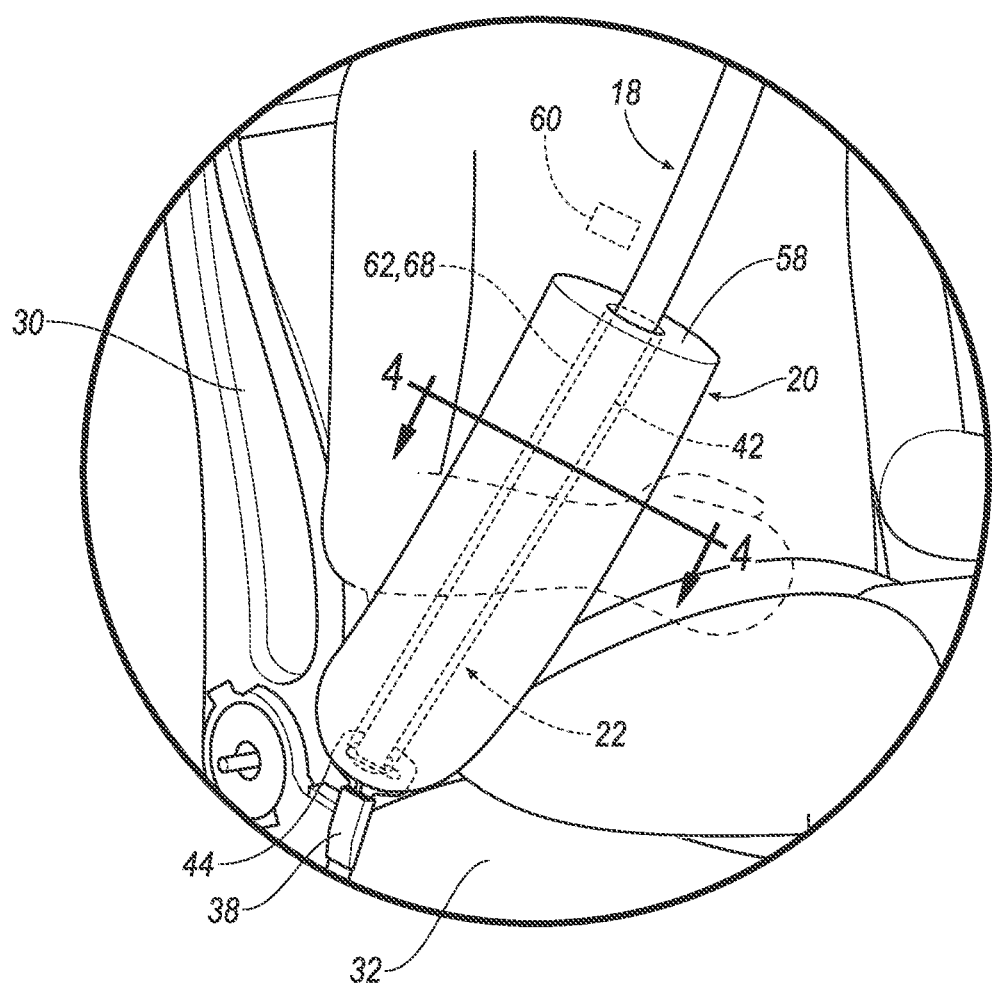
FIG. 3 is a magnified view of FIG. 2.

The airbag 20 is inflatable from an uninflated position to an inflated position. As shown in FIGS. 2 and 3, in the inflated position, the airbag 20 biases the shoulder band 42 of the seatbelt webbing 18 away from the seat back. Specifically, when the seatbelt latch 14 is in the engaged position and the airbag 20 is in the inflated position, the airbag 20 biases the shoulder band 42 away from an occu-pant in the seat. The airbag 20 exerts a force on the shoulder band 42 to space the shoulder band 42 from the chest of the occupant.

As shown in FIGS. 1, 2, 3, and 5, the airbag 20 is mounted to the latch. In other words, at least a portion of the airbag 20, i.e., a fixed end 44, is fixed relative to the latch. The airbag 20 may be directly mounted to the latch, i.e., with the lack of any other component therebetween, or may be indirectly mounted to the latch, i.e., with an intermediate component fixed relative to the latch and fixed relative to the airbag 20. As examples, the airbag 20 may be mounted to the latch by adhesive, stitching, ultrasonic welding, fasteners, and/or co-molding, etc. The airbag 20 remains mounted to the latch when the airbag 20 is in the uninflated position and when the airbag 20 is in the inflated position.

Figure 5:
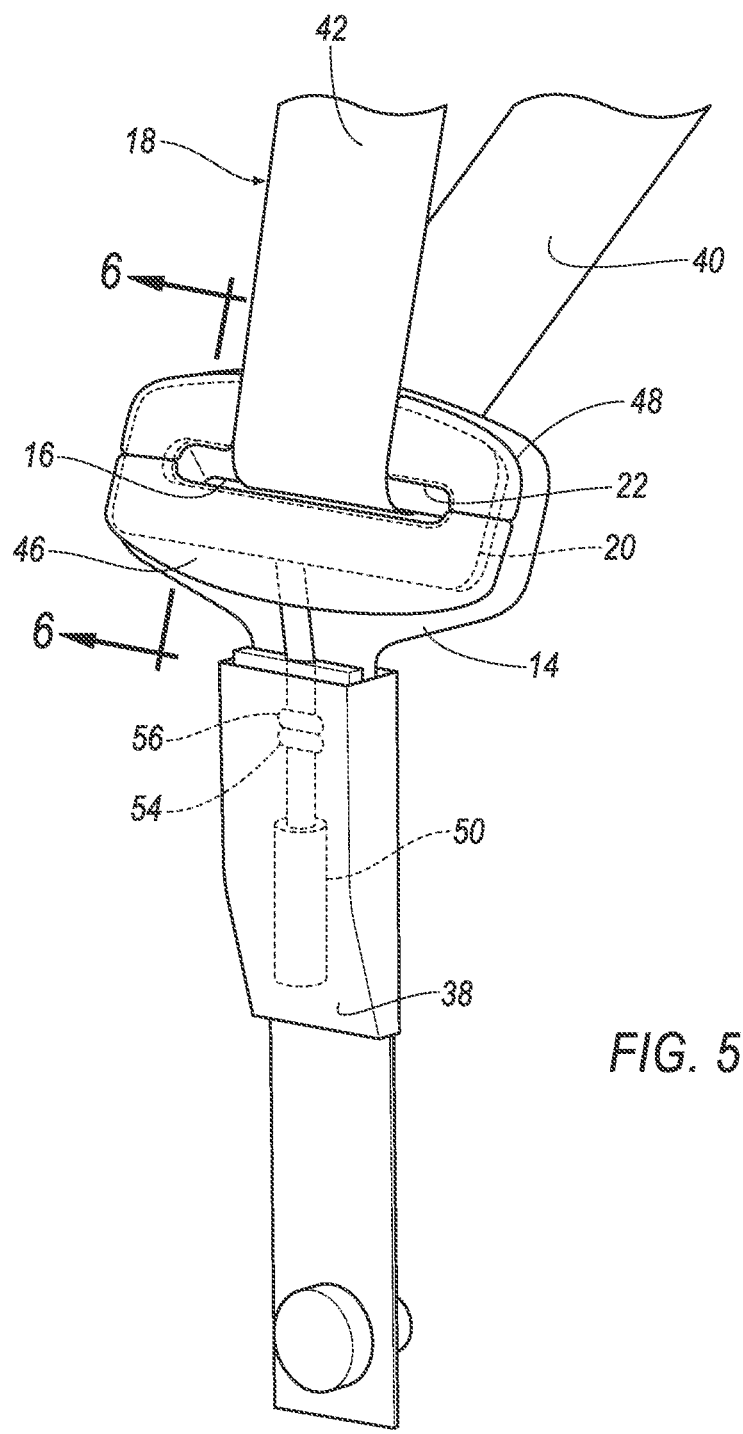
FIG. 5 is a perspective view of the seatbelt latch engaged with the seatbelt buckle.
Figure 6:
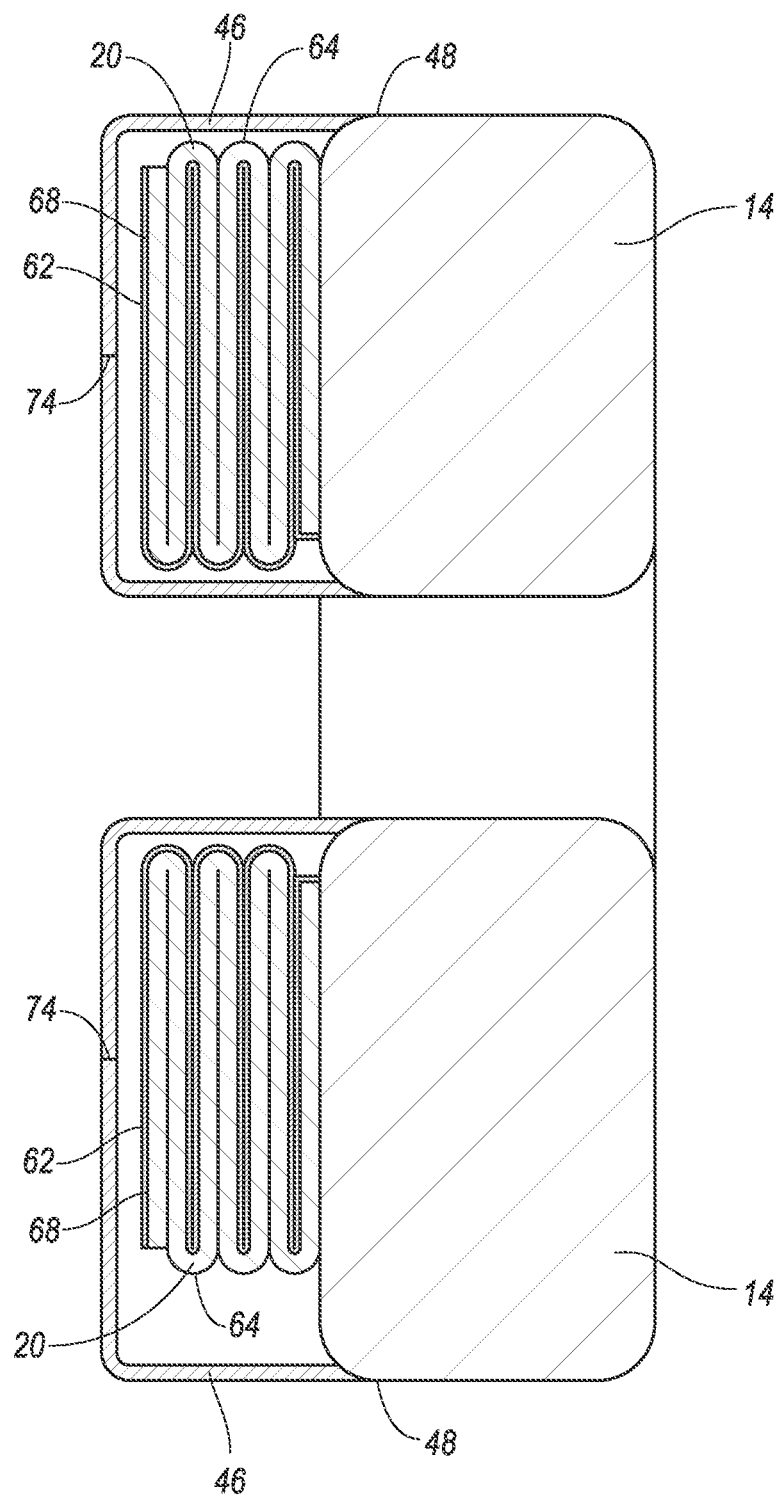
FIG. 6 is a cross-sectional view through the seatbelt latch.

As shown in FIGS. 5 and 6, a cover 46 may be connected to the latch. The cover 46 may encase the airbag 20 in the uninflated position, i.e., the airbag 20 may be between the cover 46 and the latch in the uninflated position. As one example, the cover 46 may include an edge 48 mounted to the latch. Specifically, the cover 46 may be directly or indirectly mounted to the latch. As examples, the cover 46 may be mounted to the latch by adhesive, stitching, ultrasonic welding, fasteners, and/or co-molding, etc. As another example of the cover 46 being connected to the latch, the cover 46 may be shrink-wrapped around the seatbelt latch 14. The cover 46 may extend in a continuous loop around the second slot 22 to encase the airbag 20 when the airbag 20 is in the uninflated position.

The cover 46 is releasable relative to the latch. In other words, the cover 46 releases to allow the airbag 20 to inflate to the inflated position. In one example, the cover 46 may include a seam 74 that is frangible relative to the rest of the cover 46 to allow the airbag 20 to break through the seam 74 during inflation. In other words, when the airbag 20 inflates to the inflated position, the seam 74 may separate to allow the airbag 20 to inflate. In another example, the cover 46 may disconnect from the latch when the airbag 20 inflates to the inflated position to allow the airbag 20 to inflate. For example, the edge 48 may release from the latch when the airbag 20 inflates.

The airbag 20 may be fabric. The airbag 20 may be a woven polymer or any other material. As one example, the airbag 20 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The assembly 10 includes an inflator 50 in communication with the airbag 20. Upon receiving a signal from, e.g., a computer 52, the inflator 50 inflates the airbag 20 with an inflatable medium, such as a gas. The inflator 50 may be, for example, a pyrotechnic inflator that uses a chemical reaction to drive inflation medium to the airbag 20. The inflator 50 may be of any suitable type, for example, a cold-gas inflator.

The inflator 50 may be mounted in a location such that the inflator 50 is in fluid communication with the airbag 20 when the seatbelt latch 14 is engaged with the seatbelt buckle 38. In one example, as shown in FIG. 5, the inflator 50 may be supported by, e.g., mounted to, the seatbelt buckle. In another example, the inflator 50 may be mounted to the seat bottom 32, e.g., the frame of the seat bottom 32, and may include a fill tube through the seatbelt buckle 38.

The seatbelt buckle 38 and the seatbelt latch 14 each include a connector 54, 56 that when connected to each other, provide a path to transmit inflation medium from the inflator 50 to the airbag 20. Upon activation of the inflator 50, inflation medium flows through the connectors 54, 56 from the inflator 50 to the airbag 20 to inflate the airbag 20 from the uninflated position to the inflated position. The connectors 54, 56 may include fill tubes and interfaces for connecting to each other, as described below.

The connector 54 of the seatbelt buckle 38 is in fluid communication with the inflator 50, i.e., delivers inflation medium from the inflator 50 through the connector 54 when the inflator 50 is activated. The connector 56 of the seatbelt latch 14 is in fluid communication with the airbag 20, i.e., delivers inflation medium from the connector 56 to the airbag 20 when the inflator 50 is activated.

The connector 54 of the seatbelt buckle 38 and the connector 56 of the seatbelt latch 14 are designed (i.e., sized, shaped, positioned, etc.) to engage each other, i.e., at the interfaces, when the seatbelt latch 14 is engaged with the seatbelt buckle 38 to complete the path from the inflator 50 to the airbag 20. The connectors 54, 56, when engaged with each other, provide a substantially sealed and continuous path for inflation medium from the inflator 50 to the airbag 20. As an example, one of the connectors 54, 56 may be a female connector and the other of the connectors may be a male connector received in the female connector. One or both of the connectors 54, 56 may include a seal, e.g., an elastomeric seal at one or both interfaces, that seals the connectors 54, 56 to each other to prevent or limit leakage of inflation medium.

In one example, the connector 54, 56 may directly connect the inflator 50 to the airbag 20. In another example, the connector 54, 56 may indirectly connect the inflator 50 and the airbag 20, i.e., there may be intermediate connections between the inflator 50 and the airbag 20 for inflation of the airbag 20 when the seatbelt latch 14 is engaged with the seatbelt buckle 38. In one example, the connector 56 of the seatbelt latch 14 may be directly connected to the connector 54 of the seatbelt buckle 38. In another example, the connector 56 of the seatbelt latch 14 may be indirectly connected to the connector 54 of the seatbelt buckle 38, i.e., there may be intermediate connections between the connectors 54, 56.

When the inflator 50 is activated, inflatable medium travels from the inflator 50 through the connectors 54, 56 to the airbag 20. The inflator 50 may be activated in the event of an impact to the vehicle 12. The inflator 50 may only be activated when the seatbelt latch 14 is engaged with the seatbelt buckle 38 in the event of an impact to the vehicle 12.

When the seatbelt latch 14 is disengaged with the seatbelt buckle 38, the airbag 20 is disconnected from the inflator 50, i.e., is not in fluid communication with the inflator 50. The computer 52 may be programmed to not instruct the inflator 50 to activate when the seatbelt latch 14 is disengaged with the seatbelt buckle 38.

As shown in FIGS. 2 and 3, the airbag 20 is inflatable away from the latch along the seatbelt webbing 18 to the inflated position. In other words, as the airbag 20 moves from the uninflated position to the inflated position, the airbag 20 inflates away from the latch and along the seatbelt webbing 18 to the inflated position. The airbag 20 may slide along the seatbelt webbing 18 as the airbag 20 inflates to the inflated position away from the latch.

The airbag 20 has a distal end 58 movable away from the latch of the airbag 20 along the webbing 18 toward the inflated position. As the airbag 20 moves from the uninflated position to the inflated position, the distal end 58 moves along the seatbelt webbing 18 until the airbag 20 reaches the inflated position. Specifically, the distal end 58 of the airbag 20 may be movable away from the fixed end 44 of the airbag 20 as the airbag 20 moves toward the inflated position.

The airbag 20 is elongated from the fixed end 44 to the distal end 58 in the inflated position, i.e., the airbag 20 is elongated along the should band of the seatbelt webbing 18. The airbag 20 lengthens as the airbag 20 moves from the uninflated position to the inflated position from the fixed end 44 to the distal end 58. The airbag 20 elongates along the shoulder band 42 of the seatbelt webbing 18 to the inflated position to bias the seatbelt webbing 18 away from the chest of an occupant who may be in the seat.

In the inflated position, the distal end 58 may be spaced from the fixed end 44. The distal end 58 of the airbag 20 may be at a higher position along the seatbelt webbing 18 than the fixed end 44 of the airbag 20 when the airbag 20 is in the inflated position.

With continued reference to FIGS. 2 and 3, the second slot 22 may be generally through the center of the airbag 20. The seatbelt webbing 18 extends through the second slot 22. The second slot 22 may extend through the fixed end 44 and the distal end 58, i.e., the seatbelt may extend through the opening in the second slot 22. When the airbag 20 is inflated to the inflated position, the second slot 22 is elongated, i.e., is an elongated bore extending through the airbag 20 from the fixed end 44 to the distal end 58. The seatbelt webbing 18, e.g., the shoulder band, may extend through the second slot 22, i.e., the elongated bore in the inflated position.

As the airbag 20 inflates, the second slot 22 elongates along the shoulder band 42 of the seatbelt webbing 18. When the airbag 20 is in the inflated position, the second slot 22 extends through the fixed end 44 and the distal end 58. The second slot 22 elongates between the fixed end 44 and the distal end 58 when the airbag 20 is in the inflated position. The airbag 20 elongates as the airbag 20 moves from the uninflated position to the inflated position. Specifically, the distal end 58 of the airbag 20 moves upwardly along the shoulder band 42 of the seatbelt webbing 18 as the airbag 20 inflates to the inflated position.

The airbag 20 may be tubular about the seatbelt webbing 18 in the inflated position. For example, the airbag 20 may be of a generally annular shape when the airbag 20 is in the inflated position. The airbag 20 may encircle the seatbelt webbing 18 in a continuous loop, i.e., an endless loop, when the seatbelt is in the inflated position, i.e., the airbag 20 extends around the seatbelt webbing 18, and the airbag 20 expands away from the seatbelt webbing 18. In other words, the second slot 22 encircles the airbag 20 in the inflated position.

The airbag 20 may be inflatable radially relative to the seatbelt webbing 18. When the airbag 20 inflates from the uninflated position to the inflated position, the airbag 20 inflates radially away from the seatbelt. As the airbag 20 inflates to the inflated position, the airbag 20 inflates along the seatbelt webbing 18, away from the seatbelt latch 14 and inflates away from the airbag 20 in a generally circular way.

The seatbelt webbing 18 may extend across a pressure sensor 60 in a chest of a THOR crash test dummy when the airbag 20 is in the inflated position. The airbag 20 may bias the seatbelt webbing 18 away from the pressure sensor 60 when the airbag 20 is in the inflated position, i.e., the distal end 58 may bias the seatbelt webbing 18 away from the pressure sensor 60. The airbag 20 in the inflated position may space the seatbelt webbing 18 away from the pressure sensor 60 to reduce pressure on the pressure sensor 60 in the THOR crash test dummy in a vehicle crash test.

Figure 4:
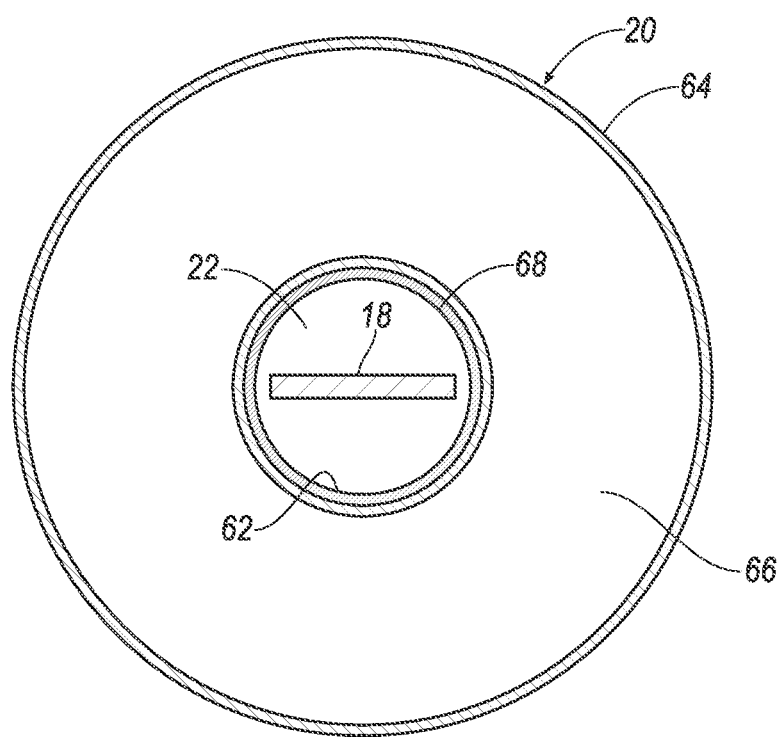
FIG. 4 is a cross-sectional view of through the airbag and seatbelt webbing.

As shown in FIGS. 3 and 4, the airbag 20 may include an inner surface 62 extending around the second slot 22, an exterior surface 64, and an inflation chamber 66 between the exterior surface 64 and the inner surface 62. The inner surface 62 and the outer surface may be generally concentric. The inner surface 62 and the exterior surface 64 may extend from the fixed end 44 to the distal end 58 around the second slot 22. The inner surface 62 may extend along the second slot 22 when the airbag 20 is in the inflated position from the fixed end 44 to the distal end 58.

The inner surface 62 of the airbag 20 extends around the second slot 22, i.e., around the elongated bore in the inflated position. The inner surface 62 of the airbag 20 may abut the seatbelt webbing 18 as the webbing 18 extends through the second slot 22. When the airbag 20 is in the inflated position, the seatbelt webbing 18 may rest against the inner surface 62 of the airbag 20, i.e., the seatbelt webbing 18 may be biased toward the occupant in the seat 28 which biases the seatbelt webbing 18 to one side of the inner surface 62 versus the other side.

The exterior surface 64 is spaced from the inner surface 62. The exterior surface 64 may extend from the fixed end 44 of the distal end 58 of the airbag 20 exterior to the inflation chamber 66 and around the inner surface 62. As shown in FIG. 4, the inflation chamber 66 is between the exterior surface 64 and the inner surface 62, i.e., when the airbag 20 is in the inflated position an inflatable medium may be between the inner surface 62 and the exterior surface 64, making the exterior surface 64 spaced from the inner surface 62.

The exterior surface 64 may abut a chest of an occupant in the seat 28 when the seatbelt latch 14 is engaged with the seatbelt buckle 38. The exterior surface 64 may rest against the chest of the occupant in the seat 28 when the airbag 20 is in the inflated position, i.e., the seatbelt webbing 18 may bias the exterior surface 64 of the airbag 20 toward the chest of the occupant.

The inflator 50 may be in fluid communication with the inflation chamber 66, e.g. through the connectors 54, 56 of the latch 14 and the buckle 38. When the airbag 20 moves to the inflated position, the inflator 50 may fill the inflation chamber 66 with an inflatable medium if the seatbelt latch 14 is engaged with the seatbelt buckle 38. The volume of the inflation chamber 66 increases until the airbag 20 reaches the inflated position.

The inflation chamber 66 may extend between the fixed end 44 and the distal end 58 of the airbag 20 when the airbag 20 is in the inflated position, i.e., the inflation chamber 66 may extend from the latch to the distal end 58 of the airbag 20. In one example, the inflatable medium may fill the inflation chamber 66 from the fixed end 44 to the distal end 58 until the airbag 20 reaches the inflated position. In a second example, the inflation chamber 66 may include dead areas to control movement of the occupant in the event of an impact to the vehicle 12.

As shown in FIGS. 4 and 6, the airbag 20 may include a sleeve 68 around the second slot 22, i.e., in the elongated bore in the inflated position. The sleeve 68 may include the inner surface 62, a portion of the inner surface 62, etc. The sleeve 68 extends from the fixed end 44 of the airbag 20 to the distal end 58 of the airbag 20. The sleeve 68 of the airbag 20 is movable along the seatbelt webbing 18 as the airbag 20 inflates from the uninflated position to the inflated position, i.e., the sleeve 68 slides along the seatbelt webbing 18 when the airbag 20 inflates to the inflated position.

The sleeve 68 may extend from the fixed end 44 to the distal end 58 of the airbag 20 around the second slot 22. The sleeve 68 may extend around the seatbelt webbing 18 in a continuous loop when the airbag 20 is in the inflated position. The sleeve 68 may abut the shoulder band 42 of the seatbelt webbing 18 when the airbag 20 is in the inflated position.

When the airbag 20 is in the uninflated position, the sleeve 68 may be encased in the cover 46 in addition to the airbag 20. The sleeve 68 may be folded along with the airbag 20 and encased in the cover 46. When the cover 46 becomes detached from the seatbelt latch 14, the sleeve 68 may expand simultaneously with the inflation of the airbag 20. The sleeve 68 may be between the cover 46 and the seatbelt latch 14 when the airbag 20 is in the uninflated position.

The sleeve 68 may be tear-resistant relative to the exterior surface 64. For example, the sleeve 68 may be of a different material type than the exterior surface 64, a different thickness than the exterior surface 64, and/or have a coating. In any event, the sleeve 68 may be more resistant to tearing than the exterior surface 64 of the airbag 20. Specifically, the sleeve 68 may be designed (i.e., material selection, thickness, coating, etc.) to resist tearing when sliding along the seatbelt webbing 18 during inflation of the airbag 20. As the airbag 20 moves from the uninflated position to the inflated position, the sleeve 68 may slide along the seatbelt webbing 18 and may produce friction between the sleeve 68 and the airbag 20. The relatively high tear-resistance of the sleeve 68 reduces the likelihood of tearing along the sleeve 68 during inflation of the airbag 20.

The vehicle 12 may include impact sensors 70 to sense an impact to the vehicle 12, e.g., an offset impact. The impact sensor 70 may be in communication with the computer 52. The impact sensor 70 is programmed to detect an impact to the vehicle 12. The impact sensor 70 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 70 may be located at numerous points in or on the vehicle 12.

The computer 52 may be a microprocessor-based controller implemented via circuits, chips, or other electronic components. For example, the computer 52 may include a processor, memory, etc. The memory of the computer 52 may include memory for storing instructions executable by the processor as well as for electronically storing data and/or databases.

The computer 52, implemented via circuits, chips, or other electronic components, is included in the vehicle control system for carrying out various operations, including as described herein. The computer 52 is a computing device that generally includes a processor and a memory, the memory including one or more forms of computer-readable media, and storing instructions executable by the processor for performing various operations, including as disclosed herein. The memory of the computer 52 further generally stores remote data received via various communications mechanisms; e.g., the computer 52 is generally configured for communications on a controller area network (CAN) bus or the like, and/or for using other wired or wireless protocols, e.g., Bluetooth, etc. The computer 52 may also have a connection to an onboard diagnostics connector (OBD-II). Via a communication network 72 using Ethernet, WiFi, the CAN bus, Local Interconnect Network (LIN), and/or other wired or wireless mechanisms, the computer 52 may transmit messages to various devices in the vehicle 12 and/or receive messages from the various devices, e.g., controllers, actuators, sensors, etc., as discussed herein. For example, the computer 52 may receive data from vehicle sensors.

Although one computer 52 is shown in FIG. 1 for ease of illustration, it is to be understood that the computer 52 could include, and various operations described herein could be carried out by, one or more computing devices.

Figure 7:
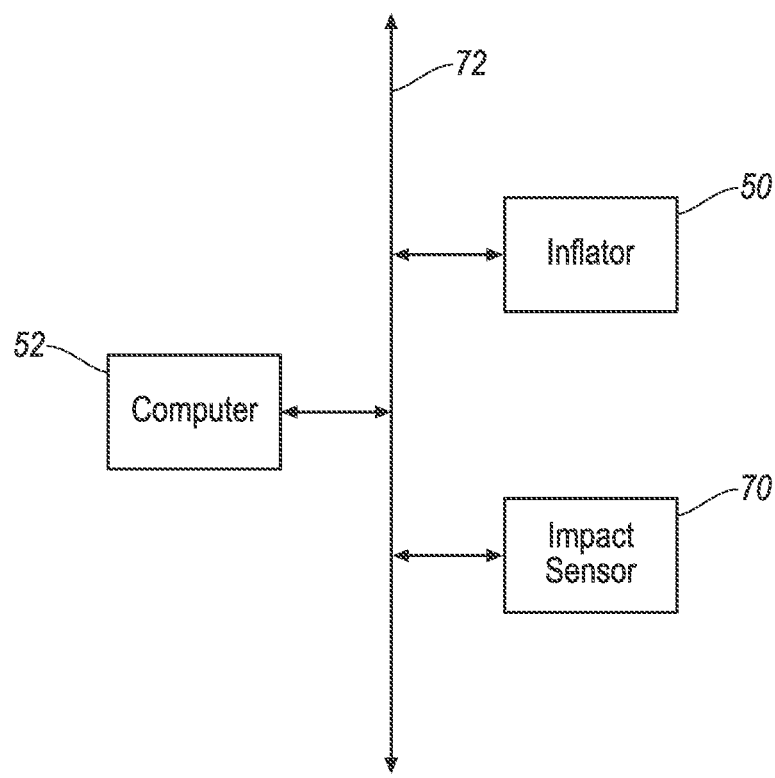
FIG. 7 is a schematic of a communication network of the vehicle.

As shown in FIG. 7, the communication network 72 includes hardware, such as a communication bus, for facilitating communication among vehicle components. The communication network 72 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 52 may be programed to detect whether the seatbelt latch 14 is engaged with the seatbelt buckle 38. When the seatbelt latch 14 is engaged with the seatbelt buckle 38, the computer 52 may be programmed to inflate the airbag 20 to the inflated position in response to an offset impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a seatbelt latch having a first slot;
a seatbelt webbing extending through the first slot;
an airbag mounted to the seatbelt latch and being inflatable from an uninflated position to an inflated position, the airbag extending in a continuous loop around the first slot in the uninflated position to define a second slot, the seatbelt webbing extending through the second slot.

2. The assembly of claim 1, wherein the airbag is inflatable away from the latch along the webbing to the inflated position.

3. The assembly of claim 2, wherein the airbag has a fixed end mounted to the latch and a distal end movable away from the latch along the webbing toward the inflated position, the second slot extending through the fixed end and the distal end.

4. The assembly of claim 3, wherein the airbag is elongated from the fixed end to the distal end in the inflated position.

5. The assembly of claim 3, wherein the seatbelt webbing is positioned to extend across a pressure sensor in a chest of a THOR crash test dummy when the airbag is in the inflated position with the distal end biasing the seatbelt webbing away from the pressure sensor.

6. The assembly of claim 2, wherein the airbag has a fixed end mounted to the latch and a distal end spaced from the fixed end in the inflated position, the second slot extending through the fixed end and the distal end.

7. The assembly of claim 2, wherein the airbag is tubular about the seatbelt webbing in the inflated position.

8. The assembly of claim 2, wherein the airbag is inflatable radially relative to the seatbelt webbing.

9. The assembly of claim 1, wherein the airbag includes an inner surface extending around the second slot, an exterior surface, and an inflation chamber between the exterior surface and the inner surface.

10. The assembly of claim 9, wherein the airbag has a fixed end mounted to the latch and a distal end movable away from the latch along the webbing toward the inflated position, the inner surface and the exterior surface extending from the fixed end to the distal end.

11. The assembly of claim 9, wherein the airbag includes a sleeve having the inner surface, the sleeve being tear resistant relative to the exterior surface.

12. The assembly of claim 11, wherein the sleeve is of a different material type than the exterior surface.

13. The assembly of claim 1, wherein the seatbelt latch is supported by and slidable along the seatbelt webbing.

14. The assembly of claim 1, further comprising an inflator in communication with the airbag.

15. The assembly of claim 14, further comprising a seatbelt buckle engageable with the latch, the seatbelt buckle including a connector in fluid communication with the inflator and in fluid communication with the airbag when the seatbelt latch is engaged with the seatbelt buckle.

16. The assembly of claim 15, wherein the seatbelt latch includes a connector in fluid communication with the airbag and in fluid communication with the connector of the seatbelt buckle when the seatbelt latch is engaged with the seatbelt buckle.

17. The assembly of claim 1, further comprising a cover connected to the latch, the cover encasing the airbag in the uninflated position.

18. The assembly of claim 1, wherein the airbag is fabric and the seatbelt latch is plastic and/or metal.

19. The assembly of claim 1, further comprising a computer programmed to inflate the airbag to the inflated position in response to an offset impact.

20. The assembly of claim 1, wherein the seatbelt latch includes a face, a fixed end of the airbag being connected to the face and extending in the continuous loop around the first slot on the face when the airbag is in the uninflated position.

* * * * *